United States Patent Office 2,782,853
Patented Feb. 26, 1957

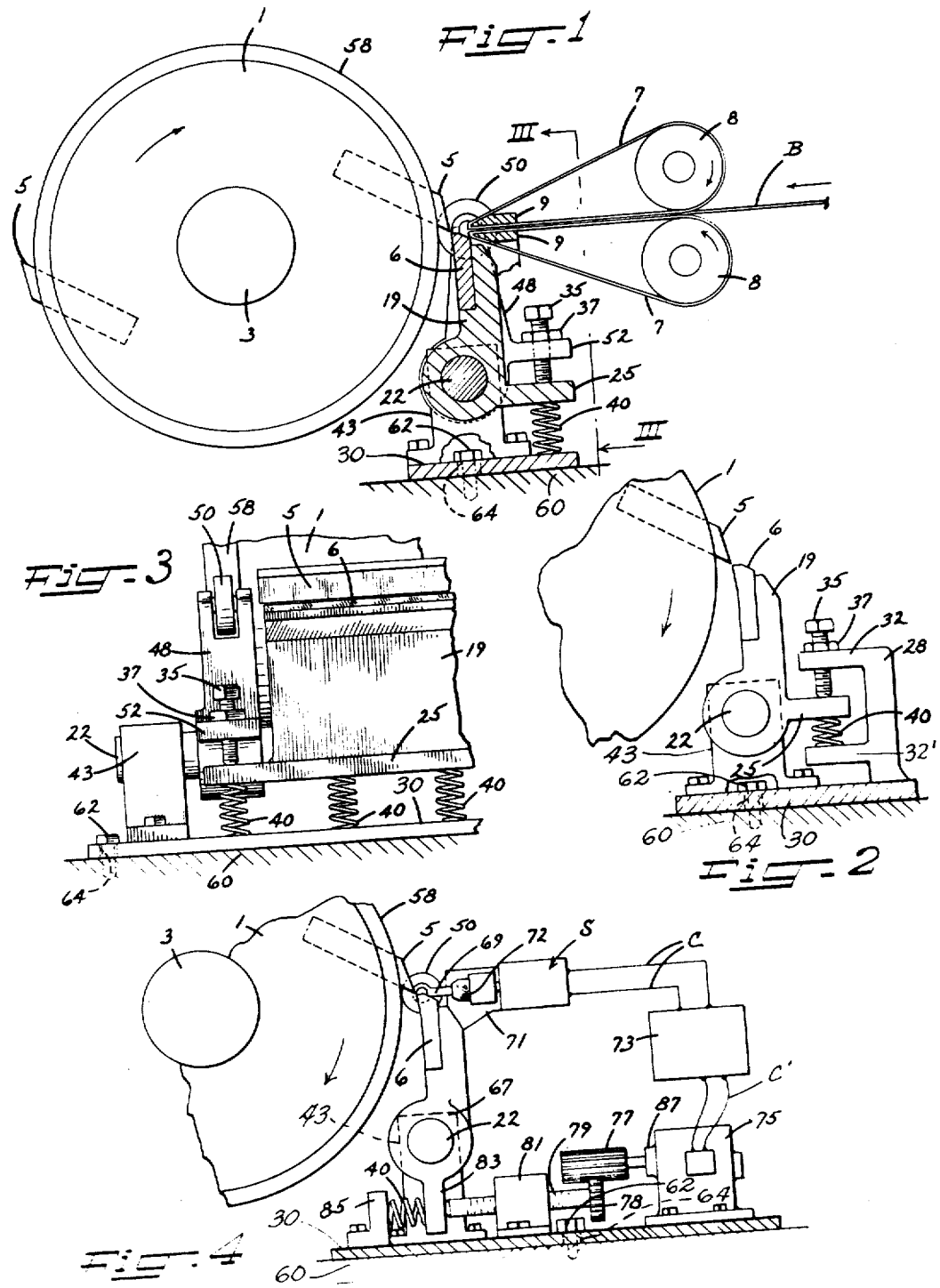

2,782,853
PRECISION FIBER CUTTER

Robert D. Heffelfinger, Lansdowne, Pa., assignor to American Viscose Corporation, Philadelphia, Pa., a corporation of Delaware Application August 8, 1955, Serial No. 526,956

19 Claims. (Cl. 164—68)

My present invention relates to a precision fiber or flock cutter for producing accurate and uniform length fiber or flock. In particular, to a fiber or flock cutter wherein the clearance between the fiber cutting blades may be accurately and easily set before the cutter is put in operation and wherein the blade clearance may be controlled and maintained during cutter operation.

In general, fiber cutters which have been used heretofore include a rotating cutter head having a plurality of cutting blades mounted therein. These rotatable blades cooperate with a stationary blade mounted adjacent the cutter head to cut or shear off bundles of continuous filaments or fibers fed to the blades into staple fiber or flock material.

There has been expressed a great deal of dissatisfaction with this type of cutter in view of the extensive amount of time and effort required to properly initially set and maintain the desired clearance between the cutting edges of the rotating blades and the stationary blade. During the operation of the cutter, the cutter head expands because of a gradual increase in temperature of the cutter head as the cutting operation progresses. Such expansion of the head, of course, gradually moves the cutting edges of the rotating blades into a closer clearance with the cutting edge of the stationary blade. Usually, with the above described cutter, the first indication that the operator has of the change of clearance between the rotating blades and the stationary blades is when he hears the opposing blades clashing. Such contact between the blades damages the cutting edges of the blades and the cutting operation must be suspended while the cutting edges of the blades are being reground or while the blades are replaced with properly ground blades.

With the above described cutters, the initial adjusting of the blade clearance before the cutting operation is started, and any subsequent adjustments of the blade clearance during the cutting operation to maintain the clearance, requires a repositioning of the blades within their mountings. Such repositioning usually requires the loosening and removal of a great number of nuts, bolts and screws which support the blades in their mountings. Painstaking and tedious care must be exercised by the operator to maintain proper blade clearance while restoring the bolts, screws and nuts in position. As mentioned above, when adjustment of the blade clearance is required after the cutter is in operation, the cutter must be shut down while making the adjustment.

It is therefore a primary object of my invention to provide a novel and improved precision fiber or flock cutter wherein the clearance between the rotating blades of the cutter head and the stationary blade may be easily set and accurately controlled and maintained during the cutting operation.

Another object of my invention is to provide in a precision fiber or flock cutter novel and improved automatic means for continuously maintaining proper clearance between the stationary blade and the rotating blades of the fiber cutter when the cutter is in operation.

Still a further object of my invention is to provide in a precision fiber or flock cutter means which will automatically maintain the preset clearance between the rotating blades and the stationary blade regardless of any non-uniformity in the length or dimensions of the cutting edge of the blades across the blade width caused by the blade grinding operation.

A further object of my invention is to provide a novel and improved safety feature for the stationary blade for the cutter of the above objects whereby yarn jam-ups between the blades may be easily and safely relieved.

Other objects and advantages of my invention will become more apparent from a study of the following description and drawings wherein:

Figure 1 is a side view partially sectioned of my precision fiber cutter showing one embodiment of the cutter;

Figure 2 is a detail showing still another embodiment of my invention;

Figure 3 is a view taken on the lines III, III of Figure 1; and

Figure 4 is a detail showing still another embodiment of my invention.

Briefly, the precision fiber cutter of my invention comprises a rotatable cutter head having at least one fiber cutting blade mounted in the head. A stationary fiber cutting blade is mounted adjacent the rotating head and cooperates with the blades of the head to cut or shear off fibers or flock material from a bundle of fibers or filaments which are supplied to the opposing blades by a feeding unit. A mounting is provided for the stationary blade and a control unit cooperates with the stationary blade mounting whereby the clearance between the opposing blades may be easily set and controlled. Resilient means contact the stationary blade mounting and oppose the adjusting means to firmly hold the stationary blade mounting firmly in place.

Referring now to the drawings, the preferred embodiments of my invention will now be described. As seen in Figure 1 there is provided a rotatable cutter head 1 mounted on a drive shaft 3. The cutter head 1 may be of any width desired. Mounted in the cutter head 1 and extending through the cutter head periphery are fiber cutting blades 5, 5 which extend substantially the width of the head 1. A stationary blade 6 mounted adjacent the cutter head 1 and extending substantially the width of the head cooperates with the rotating blades 5, 5 to cut or shear off fibers or flock material from a bundle of continuous filaments or fibers B continuously fed to the stationary blade by a pair of cooperating endless belts 7, 7 mounted around driven rolls 8, 8 and plates 9, 9. It should be pointed out here that the continuous filament bundle is used when staple fiber is to be produced by the cutter while the flock may be cut from either the staple fiber or continuous filament bundles. A plurality of the bundles of the filaments or fibers B are generally fed in a side by side relationship through the feed belts 7, 7.

The above described features do not constitute per se a part of my invention. My invention, as pointed out above, is concerned with the stationary cutting blade, its mounting and the means for setting, adjusting, controlling and maintaining the clearance between the stationary blade and the rotating blades 5, 5 of the cutter head 1. These features of my invention are contained in various embodiments which will now be described.

As seen in Figure 2, the stationary blade 6 which extends the width of the cutter head 1 is supported in a mounting 19 of substantially the same width as the blade 6 and which in turn is supported on a fixed shaft 22 also extending the width of the cutter head 1. The mounting 19 is capable of rotating about the shaft 22. A ledge extension or boss 25 of the mounting 19 extends laterally from and substantially the width of the mounting 19.

As further seen in Figure 2, a bracket 28 is affixed to the base support 30. The ledge extension of boss 25 of the blade mounting 19 is positioned between the upper and lower arms 32, 32' of the bracket 28. An adjusting screw 35 is threaded through the upper arm 32 to contact the top surface of the boss extension 25. Lock nut 37 threaded over the adjusting screw 35 cooperates with the arm 32 to lock the adjusting screw in place. A spring 40 is compressed between the lower bracket arm 32' and the bottom surface of the ledge extension or boss 25 of the stationary blade mounting 19. The operator need only adjust the single adjusting screw 35 to rotate the stationary blade mounting 19 around the shaft 22 to move the stationary blade 6 toward or away from the rotating blades 5, 5 to adjust and control the clearance between the rotating blades 5, 5 and the stationary blade 6. To rotate the stationary blade mounting 19 in a counter-clockwise direction, the operator merely raises the adjusting screw 35 and the spring 40 will urge the ledge extension 25 in an upward direction until it contacts the end of the screw 35. By lowering the adjusting screw 35, the stationary blade mounting may be rotated in a clockwise direction. Since constant pressure is being applied to the bottom surface of the boss 25 by the compressed spring 40, the stationary blade mounting 19 will be held firmly in place. As many sets of brackets 28 with adjusting screws and opposing compressed springs may be provided as desired across the width of the ledge or boss 25 to provide further accuracy in setting, adjusting, controlling and maintaining the proper blade clearance.

By experimentation, the operator may prepare time study charts showing a relationship between the operating time of the cutter and the progressive expansion of the cutter head brought about by progressively rising temperature of the cutter head due to continued operation of the cutter. With the chart as an aid, the operator may adjust the adjusting screw 35 while the cutter is operating without interrupting the cutter operation to maintain the initial and desired set clearance between the rotating blades 5 and the stationary blade 6.

The use of the spring or springs 40 also provides a safety feature in case of a jam of the fiber or filament bundle between one of the blades 5 and the stationary blade 6. In case of such a jam, the stationary blade mounting 19 may be pivoted away from the rotating blade 5 merely by manually depressing the ledge 25 of the mounting 19 against the tensioned spring 40 to retract the stationary blade 6. After the jam has been cleared, the ledge 25 is released and the spring 40 will return the mounting 19, and the blade clearance, to its proper operating setting.

A further embodiment of my invention is shown in Figures 1 and 3. As seen therein, the stationary blade 6 which extends substantially the width of the cutter head 1 is supported in a mounting 19 which is in turn positioned over a fixed shaft 22. The blade mounting 19 is capable of rotation around the shaft 22. A ledge extension or boss 25 extends laterally of the stationary blade mounting 19 for substantially the width of the cutter head 1. The shaft 22 is mounted in supports 43, 43 which are affixed to the base supporting plate 30. Also mounted for rotation around shaft 22 and adjacent one end of the cutter head 1 is a lever 48. A roller follower 50 is mounted to the upper end of the lever 48 while adjacent the opposite or lower end of the lever 48 is an arm extension 52 of the lever 48. The extension arm 52 lies immediately above the ledge extension 25 of the stationary blade mounting 19. An adjusting screw 35 is threaded through the extension arm 52 of the lever 48 to contact the upper surface of the ledge extension or boss 25 of the stationary blade mounting 19. Positioned between the lower surface of the ledge extension 25 of the blade mounting 19 and the base supporting plate 30 are a series of compression springs 40, 40 which urge upwardly the ledge extension 25 of the blade mounting 19. Lock nut 37 is threaded over the adjusting screw 35 and cooperates with the extension arm 52 of the lever to hold the adjusting screw firmly in place. A metal reference ring 58 is positioned around the periphery of the cutter head 1 at the end thereof to provide a track for the roller follower 50. The lever and roller follower structure is duplicated at the opposite end of the shaft 22 to provide accurate and uniform control of the clearance between and across the width of the opposing cutting blades.

In operation, the roller follower 50 is placed against the track 58 and the clearance between the stationary blade 6 and the rotating blades 5, 5 is set by adjusting the position of the adjusting screw 35 against the ledge extension 25 of the blade mounting 19 to rotate the blade mounting 19 around the shaft 22. As mentioned above, the cutter head progressively expands during the cutting operation because of gradually increasing temperature within the cutter head created by the continuous rotation of the cutter head 1. As the cutter head and metal reference ring 58 expand during the cutting operation the roller follower 50 is urged or moved backward to pivot the lever 48 on the shaft 22. Such action lowers the adjusting screw 35 whereby pressure is applied upon the ledge extension 25 of the stationary blade mounting to pivot the mounting 19 on the shaft 22 to move the stationary blade 6 backward away from the cutter head 1 and rotating blades 5, 5.

My invention also contains another feature which will now be described. From time to time, the cutting edges of the rotating blades 5, 5 have to be ground in order to maintain the cutting edges at maximum sharpness. In grinding the rotating blades 5, 5 the grinder is set in motion at one side of the blade and travels the width of the blade as it grinds or sharpens the cutting edge of the blade. During the course of travel of the grinder across the blade, the grinding surface of the grinder is gradually worn down whereby the grinder element at the end of its course of travel is not cutting as close as it did at the beginning of its course of travel. Such error produces or creates a variance of a thousandth of an inch or more in the length of the cutting edge of the blade across the width of the blade. In order to compensate for this error I have included means for providing angular adjustment of the stationary blade mounting 19 along its horizontal axis. As mentioned above, the supports 43, 43 for the stationary shaft 22 are affixed to the base support plate 30. The plate 45 is in turn affixed to a table support 60 by bolts 62 which extend through slots 64 of the base support 30 formed at each end of the support 30. By loosening the bolts 62, the plate 30 and the stationary blade mounting 19 affixed to the blade 45 may be moved angularly, backward or forward on the table 60 to set the stationary blade 6 at an angle desired with respect to the cutting edges of the rotatable blades 5, 5.

Still another embodiment of my invention appears in Figure 4 of the drawing. As seen therein, the stationary blade 6 is supported in a mounting 67 which is in turn positioned over fixed shaft 22. The stationary blade mounting 67 is capable of pivoting around the fixed shaft 22. As with the embodiment of Figures 1 and 3, a roller follower 50 is provided and follows a metal reference ring 58 positioned around the periphery of the cutter head 1. In this embodiment, the roller follower 50 is mounted on the free end of a spring-loaded plunger 69 which is inserted within a strain gauge detector S. A micrometer 72 is provided for adjusting the signal voltage of the detector. The strain gauge detector is mounted upon a support panel 71 which is part of the stationary blade mounting 67. The detector S is connected by a circuit C with an electronic servo unit 73 which is in turn connected by a suitable circuit C' to a reversible gear motor 75. The direction of the gear rotation of the reversible motor depends upon the signal voltage of the detector S as set up by the position of the plunger 69 within the detector S. A positive signal voltage will rotate the gear in one direction while a negative signal voltage will rotate the gear in the opposite direction. A pinion 77 mounted on a shaft of the motor 75 meshes with the teeth cut into the head 78 of an adjusting screw 79 supported in a frame 81. The adjusting screw 79 is adapted to contact a surface of a ledge or boss 83 extending downwardly from the stationary blade mounting 67. A compressed spring 40 is positioned between the opposite surface of the boss 83 and a back stop 85 which spring opposes the pressure applied to the ledge extension 83 by the adjustable screw 79 to firmly hold the stationary blade mounting 67 in place. The structure described above is duplicated at the opposite end of the cutter head 1 to provide accurate and uniform adjustment and control of the clearance between the rotating blades 5 and the stationary blade 6.

In operation, to initially set the clearance between the rotating blades 5, 5 and the stationary blade 6, the pinion 77 is disconnected from the reversible gear motor 75 by disengaging a clutch (not shown). The adjusting screw is then rotated as desired to move the mounting 67 for the stationary blade 6. The pinion 77 is then connected with the motor 75 by reengaging the clutch member after which the micrometer is adjusted to give zero signal voltage for the strain gauge detector. The cutting operation is then commenced. As the cutter head 1 and the reference ring 58 expand, for the reason mentioned above, the roller follower 50 will be urged away from the cutter head 1 to further insert the plunger 69 within the strain gauge detector to alter the signal voltage. Through circuit C the detector transmits a signal of the change to the reversible gear motor to rotate the pinion 77 of the motor in a counter-clockwise direction. Through pinion 77 the adjusting screw 79 is rotated in a clockwise direction whereby additional pressure is applied to the surface of the extension ledge 83 of the stationary blade mounting 67 to further compress the spring 40 and to rotate the stationary blade mounting 67 in a clockwise direction to move the stationary blade 6 away from the rotating blades 5, 5 whereby the original set clearance between the opposing blades is maintained.

The embodiment shown in Figure 4 also includes the feature for angularly adjusting the stationary blade 6 as described with respect to Figures 1, 2 and 3.

With the above described apparatus, flock material of uniform length (as low as one half millimeter) may be continuously produced without interrupting the operation of the cutter to readjust blade clearances.

It is to be understood that changes and variations may be made without departing from the spirit and scope of the present invention as defined in the appended claims.

I claim:

1. A precision fiber cutter comprising a rotatable cutter head, at least one fiber cutting blade mounted in the head, a stationary fiber cutting blade which cooperates with the blade of the head to cut the fibers, means for feeding a bundle of fibers or filaments to the cutting edge of the stationary blade, a mounting for the stationary blade, means for moving the stationary blade mounting toward and away from the rotatable blade to adjust the clearance between the stationary blade and the rotatable blade, and resilient means contacting the stationary blade mounting and opposing the adjusting means to hold the stationary blade mounting firmly in the adjusted position, and means for providing angular adjustment of the stationary blade along the stationary blade axis to further adjust the blade clearance.

2. A precision fiber cutter comprising a rotatable cutter head, fiber cutting blades mounted in the head, a stationary fiber cutting blade which cooperates with the blades of the head to cut the fibers, means for feeding a bundle of fibers or filaments to the cutting edge of the stationary blade, a mounting for the stationary blade, means for supporting the stationary blade mounting, means for moving the stationary blade mounting toward and away from the rotatable blades to adjust the clearance between the stationary blade and the rotatable blades, resilient means contacting the stationary blade mounting and opposing the adjusting means to hold the stationary blade mounting firmly in the adjusted position, and means for providing angular adjustment of the stationary blade along the stationary blade axis to further adjust the blade clearance.

3. A precision fiber cutter comprising a rotatable cutter head, fiber cutting blades mounted in the head, a stationary fiber cutting blade which cooperates with the blades of the head to cut the fibers, means for feeding a bundle of fibers or filaments to the cutting edge of the stationary blade, a fixed shaft, a mounting for the stationary blade positioned on the shaft, said mounting being capable of pivoting around the shaft, means for adjusting and controlling the position of the stationary blade mounting around the shaft to adjust the clearance between the stationary and rotatable blades, a compressed spring contacting the stationary blade mounting and opposing the adjusting means to firmly hold the stationary blade mounting in the adjusted position, and means for providing angular adjustment of the stationary blade along the stationary blade axis to further adjust the blade clearance.

4. A precision fiber cutter comprising a rotatable cutter head, fiber cutting blades mounted in the head, a stationary fiber cutting blade which cooperates with the blades of the head to cut the fibers, means for feeding a bundle of fibers or filaments to the cutting edge of the stationary blade, a fixed shaft, a mounting for the stationary blade positioned on the shaft, said mounting being capable of pivoting around the shaft, an extension ledge of the stationary blade mounting, an adjusting screw capable of operating upon one surface of the ledge to adjust and control the position of the stationary blade mounting around the shaft for adjusting the clearance between the stationary and rotatable blades, an anchored compressed spring positioned against the opposite surface of the extension ledge to urge the extension ledge against the adjusting screw, and means for providing angular adjustment of the stationary blade along the stationary blade axis to further adjust the blade clearance.

5. A precision fiber cutter comprising a rotatable cutter head, fiber cutting blades mounted in the head, a stationary fiber cutting blade extending substantially the width of the cutter head which cooperates with the blades of the head to cut the fibers, means for feeding bundles of fibers or filaments in a side by side relationship, to the cutting edge of the stationary blade, a fixed shaft, a mounting for the stationary blade positioned on the shaft and extending the width of the stationary blade, said mounting being capable of pivoting around the shaft, an extension ledge of the stationary blade mounting extending the width of the stationary blade mounting, adjusting screws mounted in a bracket extending across the width of the ledge which screws are capable of operating upon one surface of the ledge extension to adjust and control the position of the stationary blade mounting around the shaft for adjusting the clearance between the stationary and rotatable blades, anchored compressed springs extending across the width of the ledge and positioned against the opposite surface of the ledge to urge the extension ledge against the adjusting screws, and means for providing angular adjustment of the stationary blade along the stationary blade axis to further adjust the blade clearance.

6. A precision fiber cutter comprising a rotatable cutter head, fiber cutting blades mounted in the head, a stationary fiber cutting blade which cooperates with the blades of the head to cut the fibers, means for feeding a bundle of fibers or filaments to the cutting edge of the stationary blade, a fixed shaft, a mounting for the stationary blade positioned on the shaft, said mounting being capable of pivoting around the shaft, a lateral ledge extending from the stationary blade mounting, resilient means positioned below and against the bottom surface of the ledge to urge the stationary blade mounting toward the cutter head, a lever mounted on the fixed shaft, said lever being adapted to pivot around the shaft, a follower mounted on one end of the lever, said follower adapted to contact the periphery of the rotatable cutter head and to move the lever in response to any expansion or contraction of the cutter head due to temperature changes of the cutter head, a lateral arm extending from the lever which arm lies immediately above the lateral ledge of the stationary blade mounting, and means extending from the arm of the lever and adapted to contact and to apply pressure to the top surface of the ledge of the stationary blade mounting in response to movement of the lever.

7. A precision fiber cutter according to claim 6 wherein the follower comprises a roller and the resilient means comprises a compressed spring.

8. A precision fiber cutter according to claim 7 comprising a lock nut for the adjusting screw to lock the screw in its adjusted position.

9. A precision fiber cutter according to claim 6 wherein the means extending from the arm extension comprises an adjusting screw.

10. A precision fiber cutter according to claim 6 comprising a metal reference ring around the cutter head periphery which ring contacts the follower.

11. A precision fiber cutter comprising a rotatable cutter comprising a rotatable cutter head, fiber cutting blades mounted in the head, a stationary fiber cutting blade extending substantially the width of the cutter head which blade cooperates with the blades of the cutter head to cut the fibers, means for feeding bundles of fibers or filaments in a side by side relationship to the cutting edge of the stationary blade, a fixed shaft, a mounting for the stationary blade positioned on the shaft and extending the width of the stationary blade, said mounting being capable of pivoting around the shaft, a lateral ledge extending from the stationary blade mounting for the width of the mounting, anchored compressed springs positioned below the bottom surface and extending the width of the ledge to urge the stationary blade mounting toward the cutter head, a lever mounted on each end of the fixed shaft, said levers being adapted to pivot around the shaft, a roller follower mounted on one end of each lever, said rollers adapted to contact and follow the periphery of the rotatable cutter head and to move the levers in response to any expansion or contraction of the cutter head due to temperature changes of the cutter head, a lateral arm extending from each lever which arms lie immediately above the ledge extensions of the stationary blade mounting, and an adjusting screw extending through the arm of each lever and adapted to contact and to apply pressure to the ledge of the stationary blade mounting in response to movement of the levers.

12. A precision fiber cutter according to claim 11 comprising metal reference rings around each end of the periphery of the cutter head which rings contact the roller followers.

13. A precision fiber cutter comprising a rotatable cutter head, fiber cutting blades mounted in the head, a stationary fiber cutting blade which cooperates with the blades of the head to cut the fibers, means for feeding a bundle of fibers or filaments to the cutting edge of the stationary blade, a fixed shaft, a mounting for the stationary blade positioned on the shaft, said mounting being capable of pivoting around the shaft, a ledge extending from the stationary blade mounting, resilient means positioned against one surface of the ledge to urge the stationary blade mounting toward the cutter head, a strain gauge detector adjacent the cutter head supported by the mounting for the stationary blade, a micrometer adjusting means connected with the detector for adjusting the signal voltage of the detector, a spring loaded plunger inserted within one end of the detector adjacent the cutter head for altering the signal voltage, a follower mounted on the free end of the plunger, said follower adapted to contact and follow the periphery of the rotatable cutter head, an electronic servo unit which is actuated by the plunger of the strain gauge detector, a reversible gear motor which is actuated by the electronic servo unit, a reversible gear connected with the gear motor, means controlled by the reversible gear which means contacts and applies pressure on the surface of the ledge opposite that surface contacting the resilient means to move the stationary blade mounting toward or away from the cutter head in response to a change of position of the spring loaded plunger.

14. A precision fiber cutter according to claim 13 wherein the follower comprises a roller and the resilient means comprises a compressed spring.

15. A precision fiber cutter according to claim 13 wherein the means controlled by the reversible gear comprises an adjusting screw.

16. A precision fiber cutter according to claim 14 comprising a metal reference ring fitted around the periphery of the cutter head which ring contacts the roller follower.

17. A precision fiber cutter comprising a rotatable cutter head, fiber cutting blades mounted in the head, a stationary blade extending the width of the cutter head which blade cooperates with the blades of the head to cut the fibers, means for feeding bundles of fibers or filaments in a side by side relationship to the cutting edge of the stationary blade, a fixed shaft, a mounting for the stationary blade positioned on the shaft and extending the width of the stationary blade, said mounting being capable of pivoting around the shaft, a ledge extending from the stationary blade mounting for the width of the stationary blade mounting, anchored compressed springs positioned against one surface of the ledge to urge the stationary blade mounting toward the cutter head, a strain gauge detector supported by the stationary blade mounting adjacent each end of the cutter head, a micrometer adjusting means connected with each detector for adjusting the signal voltage of the detectors, a spring loaded plunger inserted within each strain gauge detector for altering the signal voltage, a roller follower mounted on the free end of each plunger, said roller followers adapted to contact and follow the periphery of the rotatable cutter head, an electronic servo unit for each strain gauge detector which units are actuated by the detectors, a reversible motor for each servo unit which motors are actuated by the servo units, a reversible gear for each gear motor, an adjusting screw for each reversible gear which screws are actuated by the gears and which are adapted to contact and to apply pressure against the surface of the ledge extension which is opposite to the spring contacting surfaces of the ledge to move the stationary blade mounting toward or away from the cutter head in response to movement of the spring loaded plungers.

18. A precision fiber cutter according to claim 17 comprising means for providing angular adjustment of the stationary blade mounting along the stationary blade axis.

19. A precision fiber cutter comprising a rotatable cutter head, at least one fiber cutting blade mounted in the head, a stationary fiber cutting blade which cooperates with the blade of the head to cut the fibers, means for feeding a bundle of fibers or filaments to the cutting edge of the stationary blade, a mounting for the stationary blade, means for adjusting and controlling the position of the stationary blade mounting, and additional self-adjusting means which is responsive to any change in diameter of the cutter head for adjusting and controlling the position of the stationary blade mounting during cutter operation.

References Cited in the file of this patent

UNITED STATES PATENTS

| 583,141 | Dillon | May 25, 1897 |
| 2,217,766 | Neff | Oct. 15, 1940 |

FOREIGN PATENTS

| 492,947 | Great Britain | Sept. 29, 1938 |